US008641510B2

(12) United States Patent
Singer et al.

(10) Patent No.: US 8,641,510 B2
(45) Date of Patent: Feb. 4, 2014

(54) METHOD OF REPLICATING A SYMBOL IN A GAME MATRIX

(75) Inventors: Antony Mark Singer, Ramsey, NJ (US); Joseph Dominic Masci, Montrose, NY (US); Tommy Grant Bolling, Mahwah, NJ (US); Daniel Mordecai Marks, Cold Springs, NY (US)

(73) Assignee: PTT, LLC, Mahwah, NJ (US)

( * ) Notice: Subject to any disclaimer, the term of this patent is extended or adjusted under 35 U.S.C. 154(b) by 1349 days.

(21) Appl. No.: 12/006,298

(22) Filed: Jan. 2, 2008

(65) Prior Publication Data

US 2008/0167115 A1 Jul. 10, 2008

Related U.S. Application Data

(60) Provisional application No. 60/878,790, filed on Jan. 5, 2007.

(51) Int. Cl.
*A63F 13/00* (2006.01)

(52) U.S. Cl.
USPC .................................. 463/21; 463/20; 463/25

(58) Field of Classification Search
USPC .......................................... 463/16-20, 21, 25
See application file for complete search history.

(56) References Cited

U.S. PATENT DOCUMENTS

| | | | | |
|---|---|---|---|---|
| 6,439,993 | B1 * | 8/2002 | O'Halloran | 463/16 |
| 7,070,502 | B1 * | 7/2006 | Bussick et al. | 463/20 |
| 2005/0070354 | A1 * | 3/2005 | Baerlocher et al. | 463/20 |
| 2008/0032784 | A1 * | 2/2008 | Englman | 463/21 |
| 2008/0108411 | A1 * | 5/2008 | Jensen et al. | 463/20 |
| 2008/0113735 | A1 * | 5/2008 | Maya | 463/20 |

* cited by examiner

*Primary Examiner* — Damon Pierce
(74) *Attorney, Agent, or Firm* — Jon Fallon, Esq.

(57) ABSTRACT

The present invention replicates a symbol into one or more other symbol positions of the symbol matrix in accordance with the replication properties of the location in which said symbol appears in the symbol matrix. A preferred embodiment of the present invention ("Replicating Wilds") uses a symbol matrix formed by three rows and five columns in which the middle position of the third column possesses replication properties for the wildcard symbol such that a wildcard symbol replicates itself into all adjacent symbol positions.

12 Claims, 3 Drawing Sheets

METHOD OF REPLICATING A SYMBOL IN A GAME MATRIX

COPYRIGHT NOTICE

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF INVENTION

In general, the present invention relates to new methods of replicating objects in a game matrix and, more specifically, replicating symbols in the symbol matrix of a slot machine game.

BACKGROUND OF THE INVENTION

To play a conventional slot machine, the player deposits money into the machine, sets the wager, and spins the reels. When the reels stop spinning, the player collects credits for winning symbol combinations displayed on the reels, if any, according to a predetermined pay schedule.

While the appearance of conventional slot machines may change from one theme, such as space aliens, to another theme, such as farm animals, the underlying methods of play—setting the wager, spinning the reels, collecting awards—remain the same from machine to machine.

One example of the similar methods used by conventional slot machine games is the use of a wildcard symbol which acts as another symbol to help form additional winning symbol combinations. In a common variation, a wildcard symbol appearing anywhere in the symbol matrix will expand into all positions of the column in which the wildcard symbol appeared.

The many similarities of conventional slot machines, such as the use of wildcard and expanding wildcard symbols, limit the value of the slot machine games for players, casinos, and manufacturers. Players tire of the same methods of play; casinos cannot distinguish their games from other casinos; and manufacturers cannot distinguish their products from other manufacturers.

New methods of playing slot machines, therefore, are required to provide players, casinos, and manufacturers with new slot machine games, including new ways of utilizing wildcard symbols in the symbol matrix that enhance the excitement value of the game.

SUMMARY OF THE INVENTION

The present invention replicates a symbol into one or more symbol positions of the symbol matrix in accordance with the replication properties of the location in which said symbol appears in the symbol matrix.

In general, the present invention assigns replication properties to the locations of the symbol matrix (also called "symbol positions") such that each symbol will replicate itself none, one, or more times in the symbol matrix. For example, a symbol position possesses replication properties for symbols A and B such that symbol A replicates itself into two symbol positions and symbol B replicates itself into five symbol positions upon either symbol's appearance in said symbol position.

A preferred embodiment of the present invention ("Replicating Wilds") uses a symbol matrix formed by three rows and five columns in which the middle position of the third column possesses replication properties for the wildcard symbol such that a wildcard symbol replicates itself into all adjacent symbol positions. None of other symbol positions possess replication properties for any of the symbols.

More specifically, a wildcard symbol appearing the in middle position of the third column replicates itself into all three symbol positions in the second column, the top and bottom positions of the third column, and all three symbol positions of the fourth column. The replicated wildcard symbols replace any symbols previously displayed in the symbol positions.

Following replication of a wildcard symbol, the game determines winning symbol combinations in accordance with the game's award schedule. Each of the original and replicated wildcard symbols may act as other symbols to help form winning symbol combinations and generate awards. The use of original or replicated wildcard symbols in a winning combination, however, does not affect the award value of the winning combination.

BRIEF DESCRIPTION OF THE DRAWINGS

The accompanying figures illustrate various stages of the preferred Replicating Wilds embodiment of the present invention.

DESCRIPTION OF A PREFERRED EMBODIMENT

To play the Replicating Wilds embodiment, the player initializes credits, sets the wager, spins the reels, and collects awards for winning symbol combinations formed with or without wildcard symbols, as detailed below with reference to FIGS. 1 to 3:

Initialize Credits.

Figure 1:
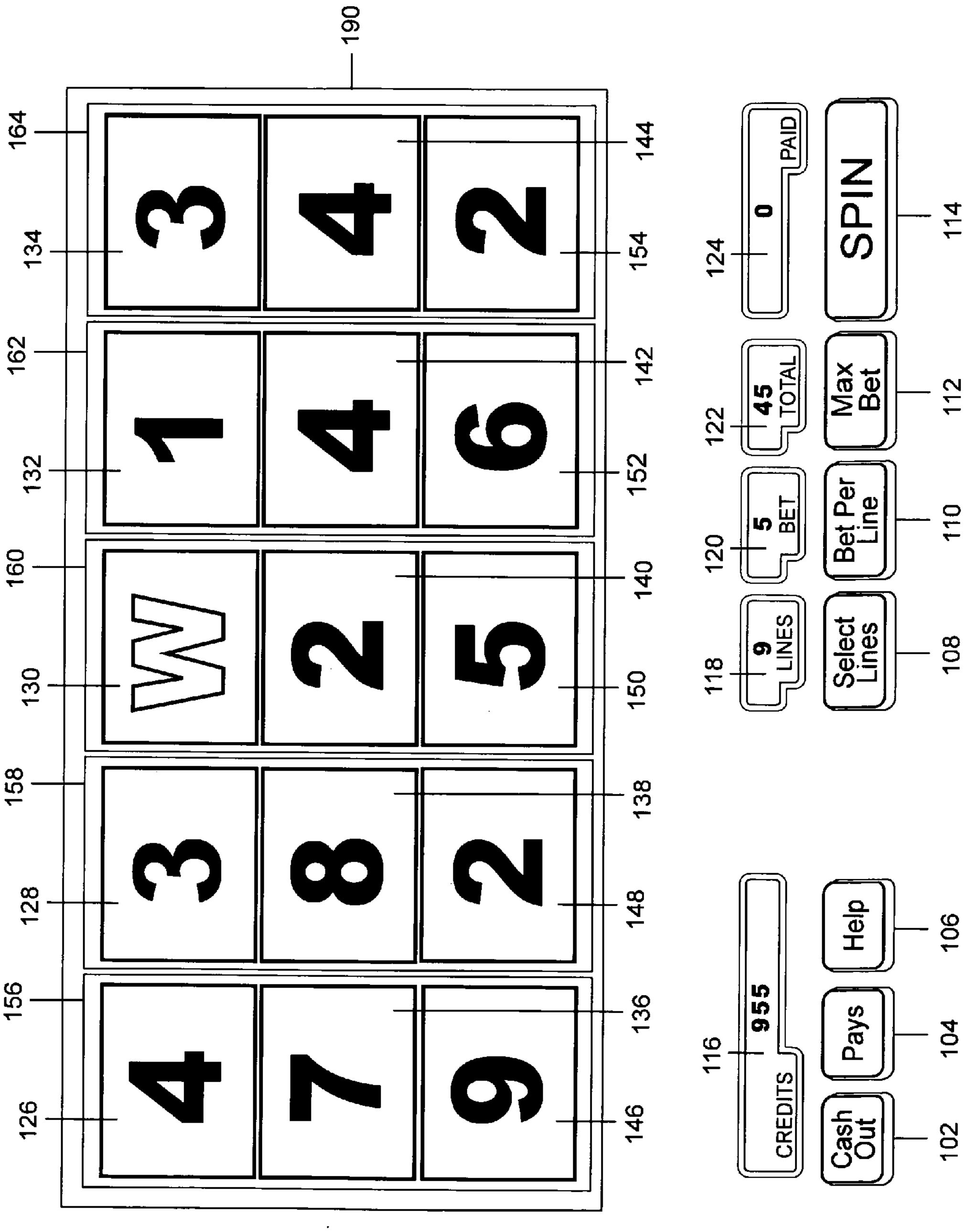
FIG. 1 shows a game screen with a wildcard symbol in the top position of the third column of the symbol matrix.

In FIG. 1, the player initializes credits by depositing money in the form of coins, gaming tokens or paper currency into a coin head (not shown) or bill acceptor (not shown). Coins and gaming tokens are collected in a reservoir (not shown) inside the gaming machine; paper currency is collected in the bill acceptor (not shown) inside the gaming machine.

If the coins, gaming tokens or paper currency are validated as authentic, the player accrues the appropriate number of playing credits on the Credit meter 116. More credits may be initialized, if necessary, by additional deposits. Alternatively, any method of initializing credits may be used including debit cards, credit cards, or other form of electronic funds transfer.

Set the Wager.

In FIG. 1, the player sets the wager by selecting pay lines and setting the bet per pay line. The wager is calculated by multiplying the number of selected pay lines by the bet per pay line. For example, the player may wager five credits on each of nine pay lines for a total bet of forty-five credits. The total bet amount is displayed on the Total Bet meter 122.

To select pay lines, the player uses the Select Pay Lines button 108 and views the number of selected pay lines on the Select Pay Lines meter 118. Pay lines are selected in a predetermined order. For example, the first pay line selected is always pay line 1, second pay line selected is always pay line 2, etc. Alternatively, fewer or greater than nine pay lines may be used with any order of pay line activation.

To set the bet per pay line, the player uses the Bet Per Pay Line button 110 and views the amount bet per pay line on the Bet Per Pay Line meter 120. The same amount is wagered on each pay line. For example, up to five credits may be wagered on each pay line. Alternatively, wagers of any amount may be placed on a pay line, with the same or different amount wagered on each pay line.

In addition, the player may use the Bet Max button 112 to place the maximum bet per pay line on all pay lines. Alternatively, any wager may be assigned a button.

Spin the Reels.

In FIG. 1, the player uses the Spin button 114 to randomly rearrange the symbols displayed in the symbol matrix 190. The symbol matrix 190 contains three symbol positions for each of the five slot reels 156-164 for a total of fifteen symbol positions 126-154. Alternatively, any number of reels with any number of symbol positions may be used.

The slot reels 156-164 spin and randomly stop one reel at-a-time, from left to right, until all five reels have stopped and all fifteen symbol positions 126-154 of the symbol matrix 190 are revealed. Alternatively, any size symbol matrix may be used and any method may be used to rearrange symbols in the symbol matrix.

Winning Combinations with or without Wildcard Symbols.

The player receives awards for winning symbol combinations formed by two or more, same, adjacent symbols, starting from the leftmost position of a pay line. For example, four “8” symbols (i.e. 8-8-8-8) is a winning symbol combination with an award of 10× the bet per line.

The player may also receive awards for winning symbol combinations formed using wildcards acting as other symbols in the symbol set. For example, three “8” symbols and a wildcard symbol (“W”) acting as an “8” symbol (i.e. 8-8-8-W) is a winning symbol combination with an award of 10× the bet per line.

The use of a wildcard symbol to form a winning symbol combination does not affect the award value. For example, the winning combinations 8-8-8-8 and 8-8-8-W both award the same 10× the bet per line award. Alternatively, wildcard symbols and/or replicated wildcard symbols may affect the award value of winning combinations.

All winning symbol combinations, including combinations with and without wildcard symbols, are listed on a predetermined pay schedule (not shown) along with their award value. The player may view the pay schedule (not shown) by using the Pays button 104. In addition, the player may press the Help button 106 to view the rules of the game.

In FIG. 1, a wildcard symbol appears in the top position 130 of the third column 160. The top position 130 of the third column 160 does not possess replication properties for any symbols. Thus, the wildcard symbol does not replicate itself into other symbol positions of the symbol matrix 190. No winning combinations are formed in the symbol matrix with or without the non-replicated wildcard symbol.

Figure 2:
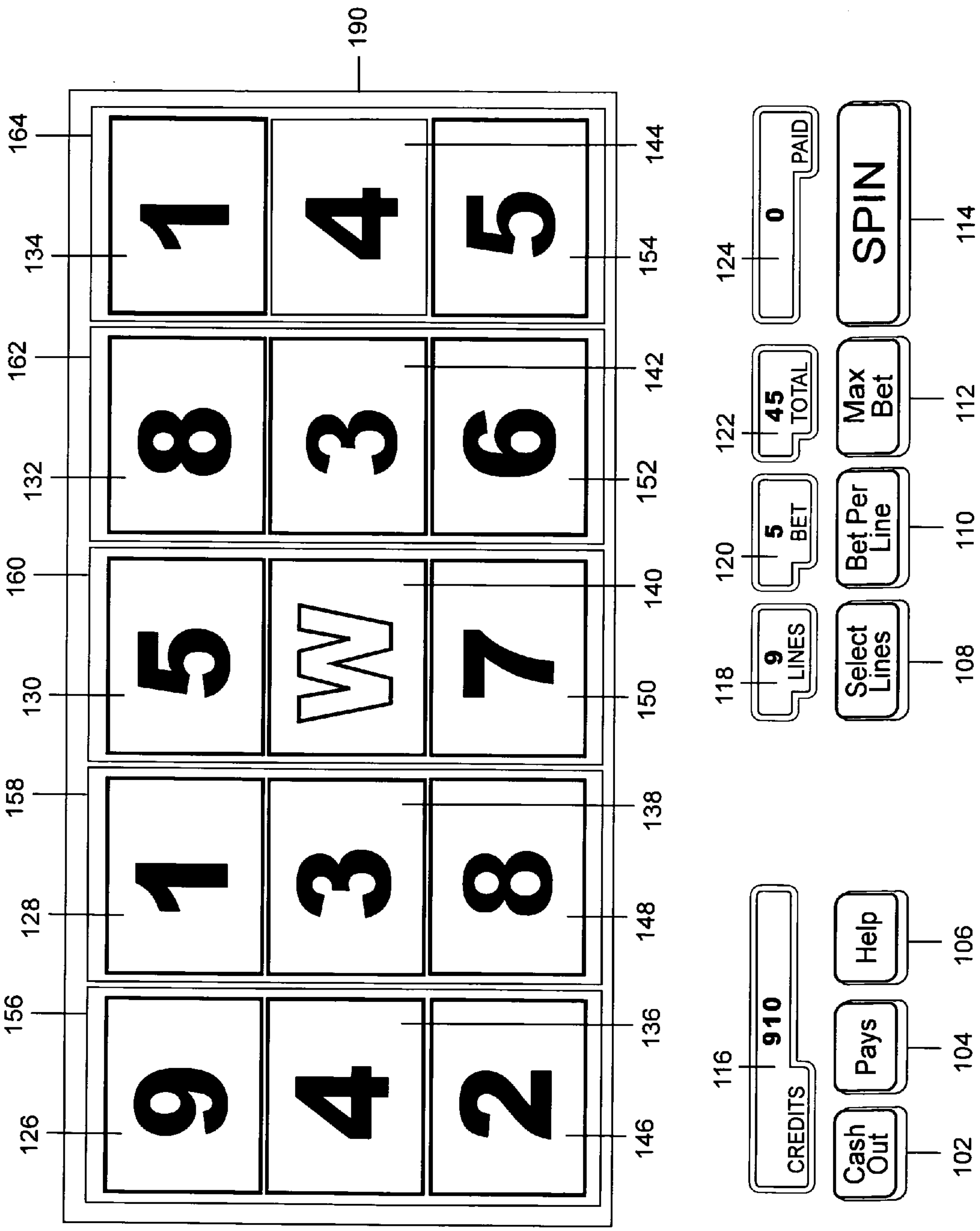
FIG. 2 shows a game screen with a wildcard symbol in the middle position of the third column of the symbol matrix, prior to the replication of the wildcard symbol.

In FIG. 2, a wildcard symbol appears in the middle position 140 of the third column 160. The middle position 140 of the third column 160 possesses replication properties such that any wildcard symbol appearing in the position will replicate itself eight times with one replicated wildcard symbol appearing in each of the eight adjacent symbol positions.

Figure 3:
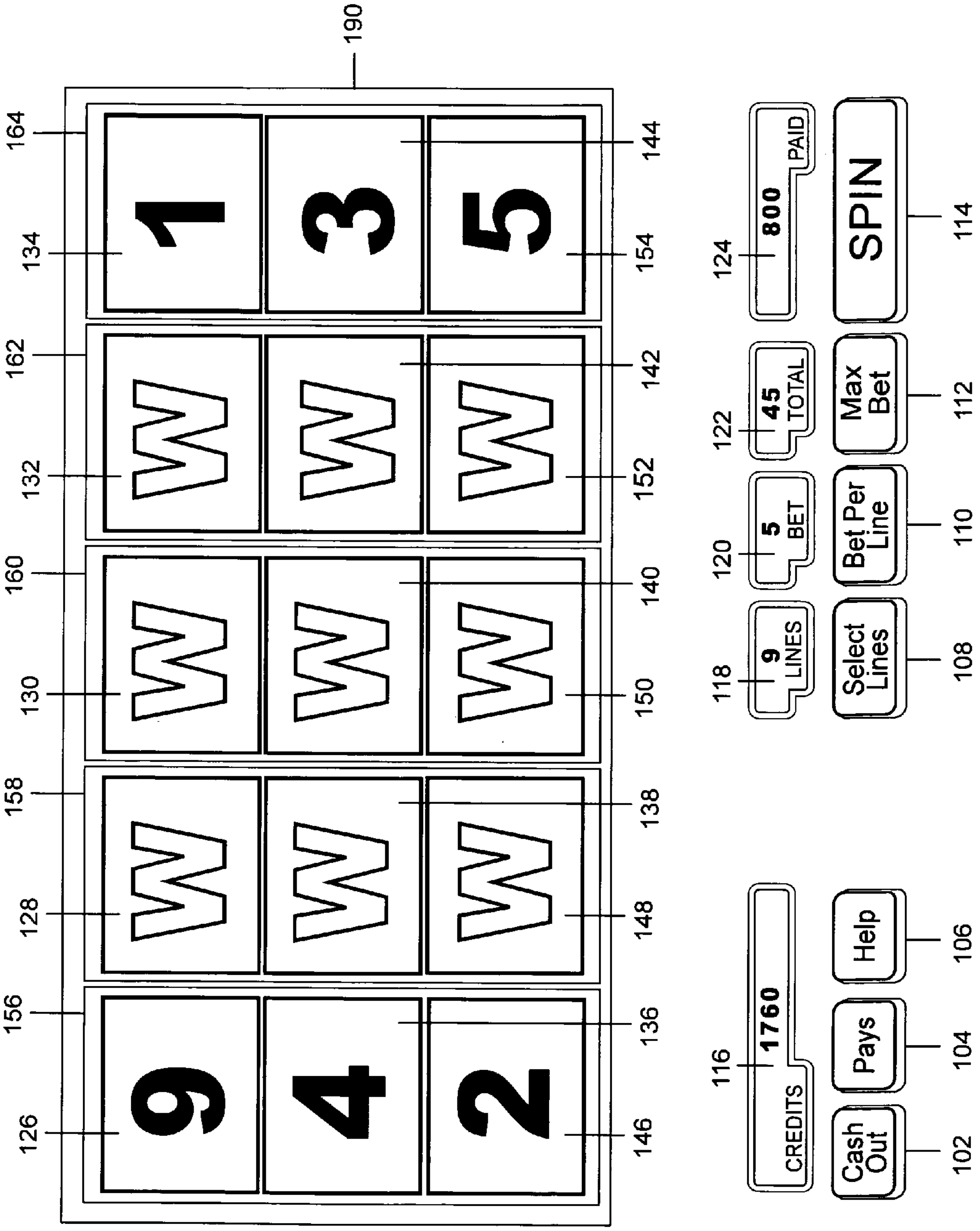
FIG. 3 shows a game screen with wildcard symbols in the top, middle and bottom positions of the second, third and fourth columns of the symbol matrix, subsequent to the replication of the wildcard symbol.

More specifically, the wildcard symbol replicates itself into the following symbol positions, as shown in FIG. 3: top 128, middle 138, and bottom 148 positions of the second column 158; top 130 and bottom 150 positions of the third column 160; and top 132, middle 142, and bottom 152 positions of the fourth column 162. All replicated wildcard symbols replace the symbols previously displayed in the symbol positions.

In FIG. 3, the replicated wildcard symbols act as other symbols to help form winning combinations. In particular, the wildcard symbols act 9, 4, and 2 symbols to help form winning combinations of 9-W-W-W, 4-W-W-W, and 2-W-W-W. Each of these winning symbol combinations generate awards according to a predetermined pay schedule (not shown).

Upon issuance of awards, the credits are added to the player’s balance of credits, as shown on the Credit meter 116. As long as the player has credits remaining on the Credit meter 116, the player may continue to play the gaming machine. The player may also collect the balance of credits by pressing the Cash Out button 102.

Description of Alternative Embodiments

In addition to the preferred embodiment, the present invention may be modified in one or more aspects, including but not limited to the following alternative embodiments:

In one embodiment, any number of symbol positions possess replication properties for symbols in the symbol set. For example, five symbol positions out of the fifteen symbol positions in the symbol matrix possess replication properties for symbols in the symbol set.

In another embodiment, symbol positions possess replication properties for any of the symbols in the symbol set. For example, a symbol position possesses replication properties for symbols A and B of symbol set A to F.

In another embodiment, symbol positions possess replication properties such that symbols replicate into any sub-set of symbol position in the symbol matrix. For example, a symbol position possesses replication properties such that symbol A only replicates into symbol positions on the first row of the symbol matrix.

In another embodiment, symbol positions possess replication properties such that symbols replicate any number of times. For example, a symbol position possesses replication properties such that symbol A replicates a random number of times between one and ten.

In another embodiment, different symbol positions may possess differing replication properties for the same symbol. For example, symbol A replicates into three adjacent symbol positions upon appearing in symbol position 1 or replicates into ten random symbol positions upon appearing in symbol position 2.

In another embodiment, the same symbol position may possess differing replication properties for different symbols. For example, symbol A replicates into five symbol positions anywhere in the symbol matrix upon appearing in a symbol position, but symbol B only replicates two times into adjacent symbol positions upon appearing in the same symbol position.

In another embodiment, the same symbol position may possess differing replication properties for the same symbol. For example, symbol A appearing in symbol position 1 replicates into five symbol positions when the bet is any amount less than the maximum wager, but the same symbol appearing in the same symbol position replicates ten times when the maximum wager is placed.

In another embodiment, replicated symbols may remain in the symbol matrix for any duration, including spins, time, wins, losses, or wagers. For example, a wildcard symbol may remain replicated within the symbol matrix for 3 spins plus an additional 20 seconds.

In another embodiment, replicated symbols may offer any type of award, such as credits, currency, free spins, or bonus games. For example, the game may award 5 free spins for each winning combination formed using a replicated symbol.

In another embodiment, replicated symbols may offer any type of award enhancement. For example, the game may provide 5× the standard award for each winning combination formed using a replicated symbol.

In another embodiment, the present invention may only occur with placement of an additional or side-bet wager. For example, an additional wager of 10 credits activates the ability to replicate symbols.

In another embodiment, the present invention may be used a feature during the primary game. In another embodiment, the present invention may be used as a feature during a secondary or bonus game.

Scope & Spirit of the Present Invention

The many features and advantages of the present invention are apparent from the descriptions of the preferred and alternative embodiments. The present invention, however, is not limited to these particular embodiments, as the invention is capable of being practiced and carried out in various ways. For example, new features may be added to an existing embodiment or features from two or more embodiments may be combined to produce a new embodiment. Further, features mentioned in any embodiment may be interchanged with similar features not mentioned that perform the same or similar functions. And, finally, the phraseology and terminology used to explain the embodiments are only descriptive and should not be regarded as limiting. The claims, therefore, seek to cover all features and advantages that fall within the true spirit and scope of the present invention.

We claim:

1. A method of playing a game using a game symbol location matrix in which a plurality of game symbols can appear within a plurality of game symbol locations within the game symbol matrix, the game playing method comprising:

providing a plurality of game symbol replication properties for at least one of a plurality of game symbol locations in the game symbol location matrix;

associating a first game symbol replication property at a first predetermined location with a predetermined first game symbol;

displaying an arrangement of at least one game symbol in a resulting game symbol matrix within the game symbol location matrix;

assessing whether said at least one game symbol in the resulting game symbol matrix has an associated first game symbol replication property, and if so:

replicating said at least one game symbol in all adjacent game symbol locations to the at least one game symbol and displaying a replicating resulting game symbol arrangement;

determining whether at least one winning combination of game symbols is formed in the resulting game symbol arrangement; and issuing award indicia if the determining step determines the occurrence of one or more winning combinations of game symbols formed in said resulting game symbol arrangement.

2. A method of playing a game using a game symbol location matrix in which a plurality of game symbols can appear within a plurality of game symbol locations within the game symbol matrix, the game playing method comprising:

a) providing at least one game symbol replication property for at least one first game symbol location in the game symbol location matrix;

b) associating a game symbol replication property at a first predetermined location with a predetermined first game symbol;

c) offering to enable a one or more game symbol replication properties in exchange for a first predetermined wager amount;

d) assessing if said first predetermined wager amount was wagered;

e) enabling said one or more game symbol replication properties if the assessing step determines that said first predetermined wager amount was wagered;

f) displaying an arrangement of at least one game symbol in a resulting game symbol matrix within the game symbol location matrix;

g) assessing whether said at least one game symbol in the resulting game symbol matrix has the at least one associated game symbol replication property, and if so:

(i) replicating said at least one game symbol in all adjacent game symbol locations to the at least one game symbol and displaying a replicating resulting game symbol arrangement;

(ii) determining if a winning combination of game symbols formed in the resulting game symbol arrangement; and (iii) issuing award indicia if the determining step determines the occurrence of one or more winning combinations of game symbols formed in said resulting game symbol arrangement.

3. The game playing method of claim 2 further comprising offering to enable one or more additional game symbol replication properties in exchange for a second predetermined wager amount; assessing if said second predetermined wager amount was wagered; and enabling said one or more additional game symbol replication properties if the assessing step determines that said second predetermined wager amount was wagered.

4. The game playing method of claim 2 further comprising offering to enable one or more additional game symbol replication properties in exchange for an additional predetermined wager amount; assessing if said additional predetermined wager amount was wagered; and enabling said one or more additional game symbol replication properties if the assessing step determines that said additional predetermined wager amount was wagered.

5. A method of playing a game using a game symbol location matrix in which a plurality of game symbols can appear within a plurality of game symbol locations within the game symbol matrix, the game playing method comprising:

a) providing at least one game symbol replication property for at least one first game symbol location in the game symbol location matrix;

b) associating a game symbol replication property at a first predetermined location with a predetermined first game symbol;

c) displaying a first arrangement of at least one game symbol in a resulting game symbol matrix within the game symbol location matrix;

d) assessing whether said at least one game symbol in the resulting game symbol matrix has at least one associated game symbol replication property, and if so:

(i) replicating said at least one game symbol in all adjacent game symbol locations to the at least one game symbol and displaying a replicating resulting game symbol arrangement;

(ii) determining if a winning combination of game symbols is formed in the resulting game symbol arrangement;

(iii) issuing award indicia if the determining step determines the occurrence of one or more winning combination of game symbols formed in said resulting game symbol arrangement; and (iv) while displaying a second game symbol arrangement of at least one game symbol in a resulting game symbol matrix within the game symbol location matrix, maintaining the replicated game symbol in said another location for a period of time.

6. The game playing method of claim 5 wherein said period of time is determined by a completion of a predetermined number of iterations of steps d(i) through d(iv).

7. The game playing method of claim 5 wherein said period of time is determined by repeated wagering of a predetermined wager amount.

8. The game playing method of claim 5 wherein said period of time is determined by obtaining a predetermined number of determinations where the determining step d(ii) determines an absence of one or more winning combinations of game symbols formed in said resulting game symbol arrangement.

9. The game playing method of claim 5 wherein said period of time is determined by obtaining a predetermined number of determinations where the determining step d(ii) determines a presence of one or more winning combinations of game symbols formed in said resulting game symbol arrangement.

10. The game playing method of claim 5 further comprising, offering to enable a one or more game symbol replication propertiey in exchange for a first predetermined wager amount; assessing if said first predetermined wager amount was wagered; enabling said one or more game symbol replication property if the assessing step determines that said first predetermined wager amount was wagered.

11. The game playing method of claim 10 further comprising offering to enable one or more additional game symbol replication properties in exchange for a second predetermined wager amount; assessing if said second predetermined wager amount was wagered; and enabling said one or more additional game symbol replication properties if the assessing step determines that said second predetermined wager amount was wagered.

12. The game playing method of claim 10 further comprising offering to enable one or more additional game symbol replication properties in exchange for an additional predetermined wager amount; assessing if said additional predetermined wager amount was wagered; and enabling said one or more additional game symbol replication properties if the assessing step determines that said additional predetermined wager amount was wagered.

* * * * *